United States Patent [19]

Costello

[11] Patent Number: 4,533,708

[45] Date of Patent: Aug. 6, 1985

[54] POLYAMPHOLYTE POLYMER

[75] Inventor: Christine A. Costello, Coraopolis, Pa.

[73] Assignee: Calgon Corporation, Pittsburgh, Pa.

[21] Appl. No.: 378,921

[22] Filed: May 17, 1982

Related U.S. Application Data

[63] Continuation-in-part of Ser. No. 331,102, Dec. 15, 1981, abandoned.

[51] Int. Cl.³ ............... C08F 220/06; C08F 220/56; C08F 226/04
[52] U.S. Cl. .................... 526/295; 526/239; 526/240; 526/265; 526/274; 526/277; 526/279; 526/286; 526/287; 526/289; 526/298; 526/307.2; 526/307.3; 526/307.6; 526/311; 526/312; 526/314
[58] Field of Search ............... 526/239, 240, 265, 274, 526/277, 279, 286, 287, 289, 298, 307.2, 307.3, 307.6, 310, 312, 314, 295

[56] References Cited

U.S. PATENT DOCUMENTS

| | | | |
|---|---|---|---|
| 3,639,208 | 2/1972 | Varveri et al. | 162/168 |
| 3,658,772 | 4/1972 | Volk et al. | 526/307.6 |
| 4,077,930 | 3/1978 | Lim et al. | 260/29.6 TA |
| 4,164,612 | 8/1979 | Suzuki et al. | 526/265 |
| 4,171,417 | 10/1979 | Dixon | 526/245 |
| 4,305,860 | 12/1981 | Iovine et al. | 260/29.6 TA |

FOREIGN PATENT DOCUMENTS 2026517 2/1980 United Kingdom .
2044321A 10/1980 United Kingdom .

*Primary Examiner*—Harry Wong, Jr.
*Attorney, Agent, or Firm*—Michael C. Sudol; R. Brent Olson; William C. Mitchell

[57] ABSTRACT

The instant invention is directed to a polyampholyte polymer, having an intrinsic viscosity of 0.05 to 4.5 dl/g in 1.0 M NaCl, prepared from 32.5 to 90 percent acrylic acid and/or methacrylic acid, 1.5 to 65 percent, by weight, of acrylamide and 0.5 to 25 percent, by weight, of dimethyldiallyl ammonium chloride and/or diethyldiallyl ammonium chloride.

3 Claims, No Drawings

POLYAMPHOLYTE POLYMER

This is a continuation-in-part of U.S. Ser. No. 331,102 filed Dec. 15, 1981 now abandoned.

BACKGROUND OF THE INVENTION

Published British Application No. 2,044,321A discloses a copolymer additive prepared from (1) a meth(acrylamido alkyl sulfonic acid) or alkali metal salt thereof and (2) a (meth)acrylamide or N-alkyl (meth)-acrylamide. The copolymer may be cross-linked with a quaternary ammonium salt.

U.S. Pat. Nos. 3,639,208 and 4,171,417 disclose polyamphoteric polymers.

DESCRIPTION OF THE INVENTION

The instant invention is directed to a polyampholyte polymer prepared from:

(i) 20 to 90%, preferably 32.5 to 85%, by weight, of at least one carboxylic functional monomer of the formula:

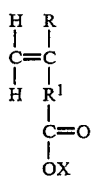

wherein

R is hydrogen, a phenyl or an alkyl group of from 1 to 3 carbon atoms, preferably a hydrogen, methyl or ethyl group, $R^1$ is a branched or straight chain containing from 0 to 12 carbon atoms, preferably 0 to 3, and X is hydrogen or an alkali or alkaline earth metal, preferably hydrogen, sodium, potassium or cesium; and (ii) 1.5 to 85%, preferably 5 to 65%, by weight, of at least one monomer of the formula:

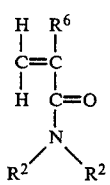

wherein $R^6$ is hydrogen, a phenyl or an alkyl group of from 1 to 3 carbon atoms, preferably a hydrogen, methyl or ethyl group, and $R^2$, which may be the same or different, is a hydrogen or an alkyl of from 1 to 3 carbon atoms, preferably hydrogen or a methyl or ethyl group; and (iii) 0.5 to 40%, preferably, 1.5 to 30%, by weight, of at least one cationic-containing monomer containing an ion selected from the group consisting of a quaternary ammonium, phosphonium or sulfonium.

A polyampholyte is a polymer containing anionic, cationic and optionally non-ionic mer units. The non-ionic mer units of the instant invention are prepared from acrylamide-type monomers.

Any carboxylic functional monomer may be used. Examples include acrylic acid, methacrylic acid, vinyl acetic acid, allylacetic acid, 4-methyl 4-pentenoic acid. The preferred carboxylic functional monomers are acrylic acid and methacrylic acid. Mixtures of carboxylic functional monomers may be used in preparing the polyampholyte.

The preferred acrylamide-type monomers are acrylamide, methacrylamide, N-methylolacrylamide and N,N-dimethylacrylamide. Mixtures of these monomers may be used in preparing the polyampholyte.

Any cationic-containing monomer containing a quaternary ammonium, phosphonium or sulfonium ion may be used. Examples include the following monomer structures:

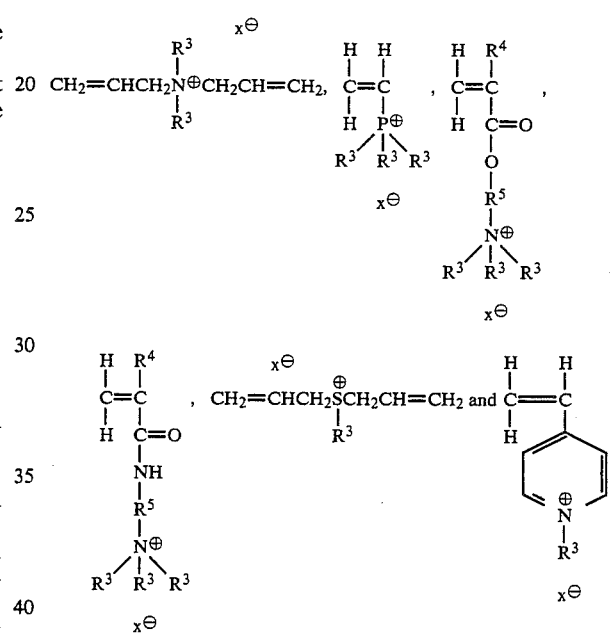

wherein $R^3$ is hydrogen, a phenyl, or alkyl group of from 1 to 3 carbon atoms, preferably hydrogen, methyl or ethyl;

$R^4$ is a hydrogen or alkyl group of from 1 to 3 carbon atoms, preferably a hydrogen or methyl;

$R^5$ is a straight or branched chain of from 1 to 12 carbon atoms, preferably a methyl, ethyl or propyl group; and X is an anion, preferably a halogen or an alkyl sulfate group.

X may be any anion in the above formula. Examples include halogen, sulfate, sulfonate, phosphate, hydroxide, borate, cyanide, carbonate, thiocyanate, thiosulfate, isocyanate, sulfite, bisulfite, nitrate, nitrite, oxalate, silicate, sulfide, cyanate, acetate and the other common inorganic and organic ions.

Specific examples of the most preferred cationic-containing monomers include diethyldiallyl ammonium chloride, dimethyldiallyl ammonium chloride, methacryloyloxy ethyl trimethyl ammonium methylsulfate and methacrylamido propyl trimethyl ammonium chloride. Mixtures of cationic-containing monomers may be used in preparing the polyampholyte.

The polyampholyte may also be prepared by polymerizing a monomer containing a tertiary amine as the pendant group with subsequent quaternization of the nitrogen in the polymer to form the cationic mer units. Likewise, sulfur and phosphorus-containing monomers may be exhaustively methylated to form cations.

The polymers are prepared from 20 to 90%, preferably 32.5 to 85%, by weight, carboxylic functional monomer; 1.5 to 85%, preferably 5 to 65%, by weight, acrylamide-type monomer; and 0.5 to 40%, preferably 1.5 to 30%, by weight, cationic-containing monomer. A higher percent of acrylamide-type monomer may be used, and subsequently hydrolyzed to a sufficient extent that the final percentages are in the preferred ranges.

The polyampholyte polymers may be prepared by mixing the monomers preferably in the presence of a free radical initiator. Any free radical initiator may be used. Examples include peroxides, azo initiators and redox systems.

The polymerization may also be initiated photochemically. The preferred catalysts are sodium persulfate or a mixture of ammonium persulfate and any azo type initiator, such as 2,2'-azobis-(2,4-dimethyl-4-methoxyvaleronitrile).

The polyampholyte polymerization may be conducted by any of a variety of procedures, for example, in solution, suspension, bulk and emulsions.

The reaction temperature is not critical. The reaction will generally occur between 10 and 100° C., preferably 40° to 60° C. It is generally impractical to run the reaction below room temperature because the reaction is too slow. Above a temperature of 60° C., the molecular weight of the polymer tends to decrease. The reaction, depending on the temperature, generally takes from 1 to 12 hours. Measuring for residual monomer will verify when the reaction is complete.

The pH of the reaction mixture is not critical. The pH is generally in the range of 4.5 to 9.0.

The percent solids in the reaction mixture is not critical. The preferred range is 1 to 50%, by weight, solids.

The molecular weight of ampholytic polymers is difficult to accurately measure. The polymers are, instead, usually identified by intrinsic viscosity. The intrinsic viscosity of the polyampholyte is critical in the instant invention. The intrinsic viscosity should be 0.05 to 4.5, preferably 0.5 to 4.5 dl/g, in 1.0 M sodium chloride (measured on a 75 Cannon Ubbelohde capillary viscometer).

The polymers of the instant invention have been found to be effective as drilling fluid additives to reduce the fluid loss of the drilling mud into the formation.

EXAMPLES 1-12

The polymers of the examples were produced by mixing the cationic, anionic and non-ionic monomers indicated in Table 1, in the amounts, solids concentration, initial temperatures and pH indicated. The monomer mix was purged with nitrogen for one hour. The solvent was deionized water. The initiator was added and the components allowed to react for about 3 hours.

TABLE I

| Example | Cationic Monomer | WT % | Anionic Monomer | WT % | Non-Ionic Monomer | WT % | Initiator (moles initiator/ moles monomer) | Solids | pH | Temp. | $[\eta]^8$ |
|---|---|---|---|---|---|---|---|---|---|---|---|
| 1. | DMDAAC[1] | 20 | Acrylic Acid | 70 | Methacrylamide | 10 | $3 \times 10^{-3}$ APS[3]/ $0.5 \times 10^{-3}$ ADM[4] | 10 | 7.0 | 60° C. | <4.3[9] |
| 2. | DMDAAC[1] | 10 | Methacrylic Acid | 70 | Acrylamide | 20 | $3 \times 10^{-3}$ APS[3]/ $0.5 \times 10^{-3}$ ADM[4] | 10 | 7.0 | 60° C. | <4.3[9] |
| 3. | MAPTAC[2] | 20 | Acrylic Acid | 70 | Acrylamide | 10 | $3 \times 10^{-3}$ APS[3] $0.5 \times 10^{-3}$ ADM[4] | 10 | 7.0 | 60° C. | <4.3[9] |
| 4. | MAPTAC[2] | 40 | Acrylic Acid | 40 | Acrylamide | 20 | $3 \times 10^{-3}$ APS[3] $0.5 \times 10^{-3}$ ADM[4] | 10 | 7.0 | 50° C. | 2.25 |
| 5. | DMDAAC[1] | 1.5 | Acrylic Acid | 48.2 | Acrylamide | 50.3 | $3 \times 10^{-3}$ SPS[5] | 30 | 4.5 | 50° C. | 1.8 |
| 6. | DMDAAC[1] | 17.5 | Acrylic Acid | 32.5 | Acrylamide | 50 | $3 \times 10^{-3}$ SPS[5] | 30 | 4.5 | 50° C. | 1.0 |
| 7. | DMDAAC[1] | 5 | Acrylic Acid | 85 | Acrylamide | 10 | $3 \times 10^{-3}$ SPS[5] | 30 | 4.5 | 50° C. | 0.82 |
| 8. | DMDAAC[1] | 25 | Acrylic Acid | 70 | Acrylamide | 5 | $3 \times 10^{-3}$ SPS[5] | 30 | 4.5 | 50° C. | 4.3 |
| 9. | DMDAAC[1] | 2.5 | Acrylic Acid | 32.5 | Acrylamide | 65 | $3 \times 10^{-3}$ SPS[5] | 30 | 4.5 | 50° C. | 1.3 |
| 10. | METAMS[6] | 10 | Acrylic Acid | 70 | Acrylamide | 10 | $2 \times 10^{-3}$ APS[3] | 10 | 7.0 | 40° C. | <4.3[9] |
| 11. | VTPB[7] | 10 | Acrylic Acid | 70 | Acrylamide | 20 | $3 \times 10^{-3}$ APS[3]/ $0.5 \times 10$ ADM[4] | 10 | 7.0 | 60° C. | 1.1 |
| 12. | DMDAAC[1] | 20 | Acrylic Acid | 70 | N,N—dimethylacrylamide | 10 | $3 \times 10^{-3}$ APS[3]/ $0.5 \times 10^{-3}$ ADM[5] | 10 | 7.0 | 60° C. | <4.3[9] |

[1] DMDAAC = dimethyldiallyl ammonium chloride
[2] MAPTAC = methacrylamido propyl trimethyl ammonium chloride
[3] APS = ammonium persulfate
[4] ADM = 2,2'-azobis-(2,4-dimethyl-4-methoxyvaleronitrile)
[5] SPS = sodium persulfate
[6] MLTAMS = methacryloyloxyethyl trimethyl ammonium methylsulfate
[7] VTPB = vinyl-triphenyl phosphonium bromide
[8] dl/g in 1.0 M sodium chloride, measured on a 75 Cannon Ubbelohde capillary viscometer
[9] Examples 1, 2, 3, 10 and 12 were observed qualitatively to have intrinsic viscosities significantly less than Example 8.

EXAMPLE 13

A 90/10 acrylamide/dimethyldiallyl ammonium chloride copolymer was prepared as indicated in Examples 1-12. The copolymer was then hydrolyzed by adding a stoichiometric amount of sodium hydroxide to achieve a 70/20/10 terpolymer of acrylic acid/acrylamide/ dimethyldially ammonium chloride.

What is claimed is:

1. A polyampholyte polymer, having an intrinsic viscosity of 0.05 to 4.5 dl/g in 1.0 M NaCl, prepared from 32.5 to 90 percent acrylic acid and/or methacrylic acid, 1.5 to 65 percent, by weight, of acrylamide and 0.5 to 25 percent, by weight, of dimethyldiallyl ammonium chloride and/or diethyldiallyl ammonium chloride.

2. The polyampholyte polymer of claim 1, wherein 1.5 to 10 percent, by weight, of dimethyldiallyl ammonium chloride and/or diethyldiallyl ammonium chloride is used.

3. The polyampholyte polymer of claim 1, wherein the polymer is a terpolymer of acrylic acid, acrylamide and dimethyldiallyl ammonium chloride.

* * * * *